Sept. 8, 1942.  W. V. MAZE  2,294,994
FLUID DRIVE FOR MOTORCYCLES
Filed Sept. 26, 1940  2 Sheets-Sheet 1
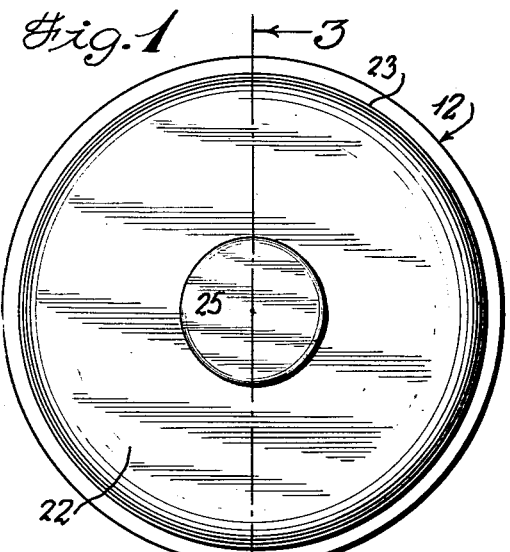
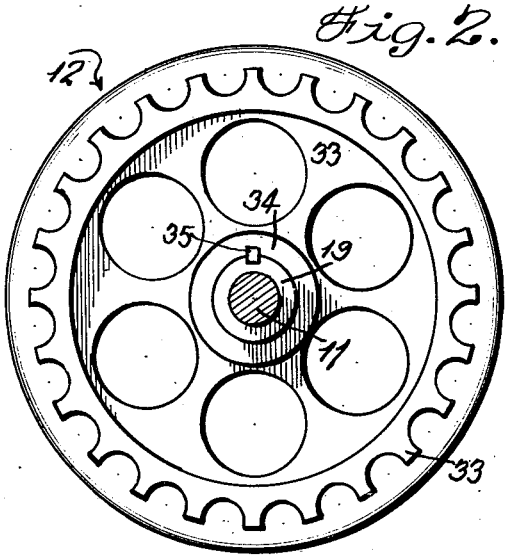
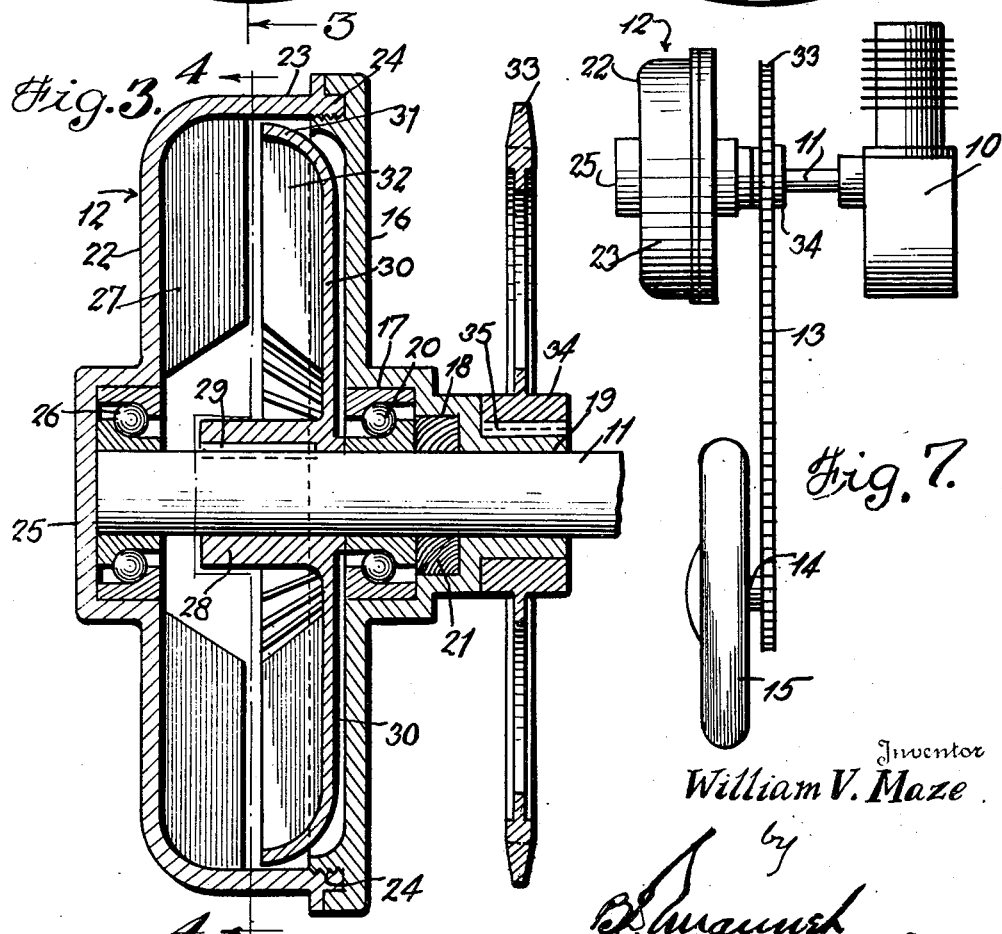
Inventor
William V. Maze
by
Attorney

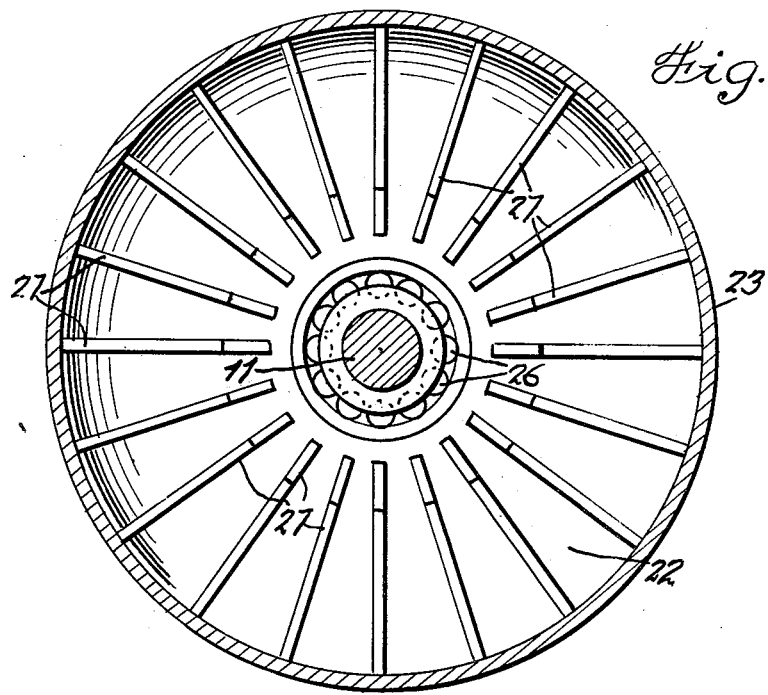
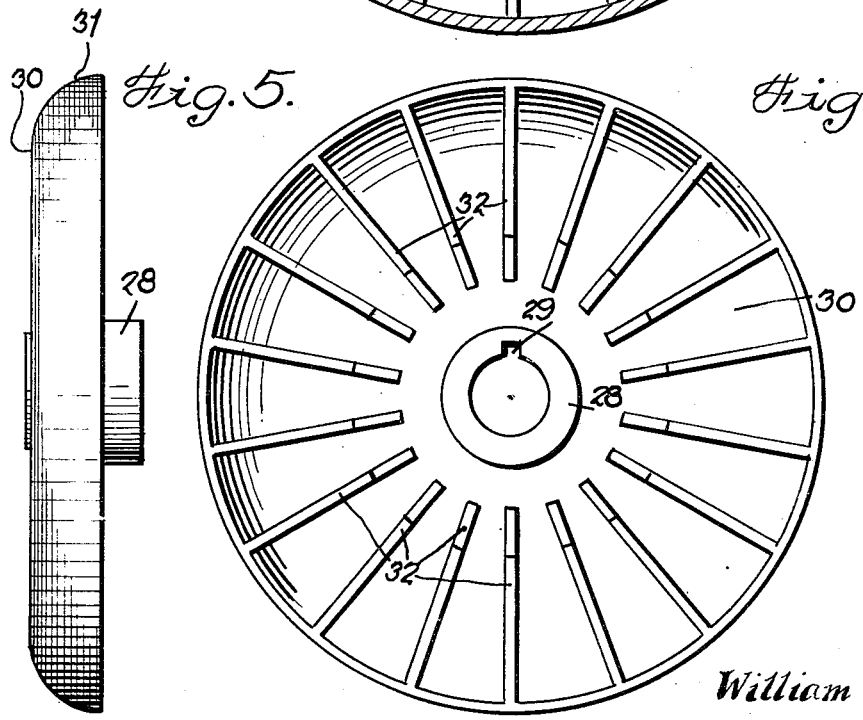

Patented Sept. 8, 1942

2,294,994

UNITED STATES PATENT OFFICE 2,294,994

FLUID DRIVE FOR MOTORCYCLES

William V. Maze, Anderson, Ind., assignor to C. E. Miller Manufacturing Corporation, Anderson, Ind., a corporation of Indiana Application September 26, 1940, Serial No. 358,568

1 Claim. (Cl. 60—54)

This invention relates to certain new and useful improvements in fluid drive for motorcycles.

The primary object of the invention is to provide a fluid drive for motorcycles wherein a motor, preferably an internal combustion engine is mounted upon the frame of a motorcycle and operatively engaged with the front wheel of the motorcycle through the medium of a fluid operated transmission mechanism to increase flexibility of the driving connections between the engine and front wheel of the motorcycle.

A further object of the invention is to provide a front wheel drive for motorcycles wherein a fluid operated transmission device is interposed between the motor and the axle carrying the front wheel and including a housing structure journalled on the shaft of the motor and operatively engaged with the axle of the front wheel with an impeller element fixed to the motor shaft within the housing structure and cooperating with the latter to effect rotation thereof.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is an outer side elevational view of the housing for the fluid drive connection between the motor and front wheel of a motorcycle;

Figure 2 is an inner side elevational view of the housing showing the sprocket wheel associated therewith, while the crank shaft of the motor upon which the housing is mounted is shown in section;

Figure 3 is an enlarged vertical cross-sectional view taken on line 3—3 of Figure 1, showing the fluid drive mechanism within the housing;

Figure 4 is a vertical cross-sectional view taken on line 4—4 of Figure 3, showing radial vanes carried by the inner wall of the rotatable housing;

Figure 5 is a side elevational view of the impeller element disconnected from the motor shaft and removed from the housing;

Figure 6 is an inner face view of the impeller element showing the radial vanes carried thereby; and Figure 7 is a schematical elevational view showing the motor, fluid drive and sprocket chain connection between the fluid drive and the axle of the front wheel of the motorcycle.

Referring more in detail to the accompanying drawings and particular to Figure 7, the fluid drive for motorcycles comprises a motor 10, preferably mounted upon the forward part of the frame structure of a motorcycle, the motor 10 preferably being in the form of an internal combustion engine that has its crank shaft 11 communicating with a fluid drive device designated in general by the reference character 12, the fluid drive device having a sprocket chain connection 13 with the axle 14 that carries the front wheel 15 of the motorcycle.

The fluid drive 12 associated with the crank shaft 11 of the motor is of housing formation for rotatable mounting upon said crank shaft and comprises a side wall 16 having laterally disposed stepped bearing portions 17, 18 and 19, a ball bearing race 20 being interposed between the bearing portion 17 and crank shaft 11, a leak-proof packing 21 being interposed between the stepped bearing portion 18 and the crank shaft while the stepped bearing portion 19 has a direct bearing on said crank shaft as illustrated in Figure 3. The outer side of the fluid drive housing includes an outer side wall 22 carrying a laterally directed annular wall 23 at its peripheral edge that has an interfitting leak-proof connection 24 with the adjacent face of the inner side wall 16 of the housing at the peripheral edge thereof. The crank shaft 11 of the motor 10 extends axially into the fluid drive housing, the outer side wall 22 being laterally offset as at 25 in an outward direction to provide a seat for a ball bearing race 26 in which the end of the crank shaft 11 is seated. As shown in Figures 3 and 4, a plurality of radially disposed vanes 27, preferably of the formation shown in Figure 3 project inwardly from the inner faces of the outer side wall 22 and the annular wall 23 and constitute a part of the fluid drive devices.

A fluid impeller is carried by the crank shaft 11 within the fluid drive housing and, as shown in Figures 3, 5 and 6, includes a bearing hub 28 keyed as at 29 upon the crank shaft 11, the hub 28 carrying a disk wall 30 at the end thereof adjacent the inner side wall 16 of the fluid drive housing while the peripheral edge of the disk wall 30 carries an arcuate annular flange 31 extending laterally from the disk wall in a direction toward the outer side wall 22 of the fluid drive housing. A plurality of radial vanes 32 are carried by the inner faces of the disk wall 30 and the annular flange 31, the adjacent edges of the vanes 27 and vanes 32 being disposed in relatively close relation.

As shown in Figures 2 and 3, a sprocket wheel 33 has the hub 34 thereof keyed as at 35 upon the outer side of the stepped bearing portion 19, the sprocket chain 13 passing over the sprocket wheel 33 also traversing the sprocket wheel on the axle 14 to which the front wheel 15 of the motor cycle is fixed.

The fluid drive housing is charged with a desired quantity of oil or other fluid and upon rotation of the crank shaft 11 under influence of the internal combustion engine 10, the impeller that is fixed to the crank shaft within the fluid drive housing is rotated, the fluid in the housing forming a clutch or transmission drive connection between the impeller and housing through the medium of the co-acting vanes 32 and 27 producing rotation of the housing upon the crank shaft 11 and corresponding rotation of the sprocket wheel 33 keyed to said housing, the chain drive 13 from the sprocket wheel 33 to the axle 14 effecting rotation of the front wheel 15 of the motorcycle. The fluid drive between the crank shaft 11 and front wheel of the motorcycle provides a flexible connection for a smoother and more even drive of the motorcycle.

While there is herein shown and described the preferred embodiment of the invention, it is nevertheless to be understood that minor changes may be made therein without departing from the spirit and scope of the invention as claimed.

I claim:

In a fluid drive of the character described, a motor having a crank shaft, fluid drive mechanism associated with the crank shaft and including a housing structure journalled on the crank shaft, an impeller fixed to the crank shaft within the housing structure and cooperating with the housing structure to effect rotation thereof, an elongated bearing extending axially and laterally of the housing at one side thereof, a shorter bearing disposed axially and laterally of the housing at the other side thereof, the shorter bearing being journalled on the crank shaft within the housing structure, the elongated bearing being journalled on a lateral flange carried by said impeller and said elongated bearing being stepped inwardly toward its end remote from the housing structure and adapted to have a driven element secured to said remote end.

WILLIAM V. MAZE.